United States Patent
Kifuku et al.

(10) Patent No.: US 7,355,361 B2
(45) Date of Patent: Apr. 8, 2008

(54) MOTOR CONTROL APPARATUS

(75) Inventors: Takayuki Kifuku, Tokyo (JP); Masaki Matsushita, Tokyo (JP); Hiroyuki Kozuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/522,894

(22) Filed: Sep. 19, 2006

(65) Prior Publication Data
US 2007/0252547 A1    Nov. 1, 2007

(30) Foreign Application Priority Data
May 1, 2006   (JP)   .............. 2006-127438

(51) Int. Cl.
*H02P 7/29* (2006.01)
*B62D 1/00* (2006.01)

(52) U.S. Cl. .............. 318/376; 318/432; 318/293

(58) Field of Classification Search ............ 318/293, 318/375–381, 430–434
See application file for complete search history.

(56) References Cited

U.S. PATENT DOCUMENTS 4,581,565 A * 4/1986 Van Pelt et al. .......... 318/294
4,800,324 A * 1/1989 Kuttner .................. 318/293
5,111,378 A * 5/1992 Nowak et al. ............ 363/98
5,428,522 A * 6/1995 Millner et al. ............ 363/63
5,552,683 A * 9/1996 Dargent ................ 318/287
6,262,546 B1 * 7/2001 Draves et al. ............ 318/293
7,068,007 B2 * 6/2006 Silitonga ................ 318/685

FOREIGN PATENT DOCUMENTS

JP    63-180567 B2    7/1988

\* cited by examiner

*Primary Examiner*—Bentsu Ro
(74) *Attorney, Agent, or Firm*—Sughrue Mion, PLLC (57) ABSTRACT

A motor control apparatus can protect circuit elements in an appropriate manner while preventing an incorrect abnormality determination when a motor is in regeneration operation, etc. The apparatus includes a target current calculation section (51), a drive control section (52) that generates a drive signal based on a current deviation ΔI between a target current (IMT) and a detected current (IMS), an abnormality determination section (53) that generates an abnormality determination signal based on the target current (IMT) and the detected current (IMS), and a regeneration operation determination section (59) that determines whether the motor (4) is in a regeneration operation state. When it is determined that the motor (4) is in a regeneration operation, a determination threshold of the abnormality determination section (53) is set to a value larger than a determination threshold during power running operation.

14 Claims, 5 Drawing Sheets

MOTOR CONTROL APPARATUS

BACKGROUND OF THE INVENTION

1. Field of the Invention

The present invention relates to a motor control apparatus used for an electric power steering system for a vehicle or the like, and more specifically to a motor control apparatus that controls a motor current in a feedback manner so as to make a motor current detected value (detected current) coincide with a motor current command value (target current). In particular, the invention relates to a novel improved or advanced technology to perform an abnormality determination in an effective manner.

2. Description of the Related Art

There has been known a motor control apparatus which determines that a motor is in an abnormal state, when a current deviation between a motor current detected value as measured and a motor current command value as stored exceeds a predetermined determination threshold, and sets the motor current command value to "0" thereby to interrupt the output of the motor (see, for example, a first patent document: Japanese examined patent application publication No. H06-29031).

In the known motor control apparatus described in the above-mentioned first patent document, when the motor of the permanent magnetic field type performs power running, a counterelectromotive force is generated in a direction to reduce the motor current, so the feedback control of the motor current tends to undershoot. As a result, a normal operation state and an abnormal state (a short fault of armature windings, a ground fault of wiring between the control apparatus and the motor, etc.) can be identified easily.

In the known motor control apparatus, an abnormality determination can be made when the motor power runs, but a counterelectromotive force is generated in a direction to increase the motor current, for example, when the motor performs a regeneration operation, or when the motor is driven to rotate in a direction opposite to the direction of its output torque for regeneration under the influence of external torque disturbances applied to the motor in spite of a power running instruction given. As a result, the motor current, even if controlled in a feedback manner, tends to overshoot, thus giving rise to a problem that there is a possibility of making a misdetermination that the motor current is abnormal.

SUMMARY OF THE INVENTION

Accordingly, the present invention is intended to solve the problem as referred to above, and has for its object to obtain a motor control apparatus which is capable of achieving appropriate protection of circuit elements while preventing an incorrect abnormality determination at the time when the motor is in regeneration operation, etc.

A motor control apparatus according to the present invention includes a motor drive part that supplies a motor current to the motor; a motor current detection part that detects the motor current; and a controller to which a motor current detected value from the motor current detection section is input, and which outputs a drive signal to the motor driving part. The controller includes: a command value calculation section that calculates a motor current command value corresponding to a target value of the motor current; and an abnormality determination section that generates an abnormality determination signal when a difference between the motor current detection value and the motor current command value indicates a value larger than or equal to a predetermined determination threshold. The motor current is controlled in a feedback manner such that the motor current detection value is made to coincide with the motor current command value. The controller further includes a regeneration operation determination section that determines whether the motor is in a regeneration operation state. When it is determined that the motor is in a regeneration operation, the controller sets the determination threshold to a value larger than that during a power running operation of the motor.

According to the present invention, it is possible to protect circuit elements in an appropriate manner while preventing an incorrect abnormality determination at the time when the motor is in regeneration operation, etc.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described in detail while referring to the accompanying drawings.

Embodiment 1

Figure 1:
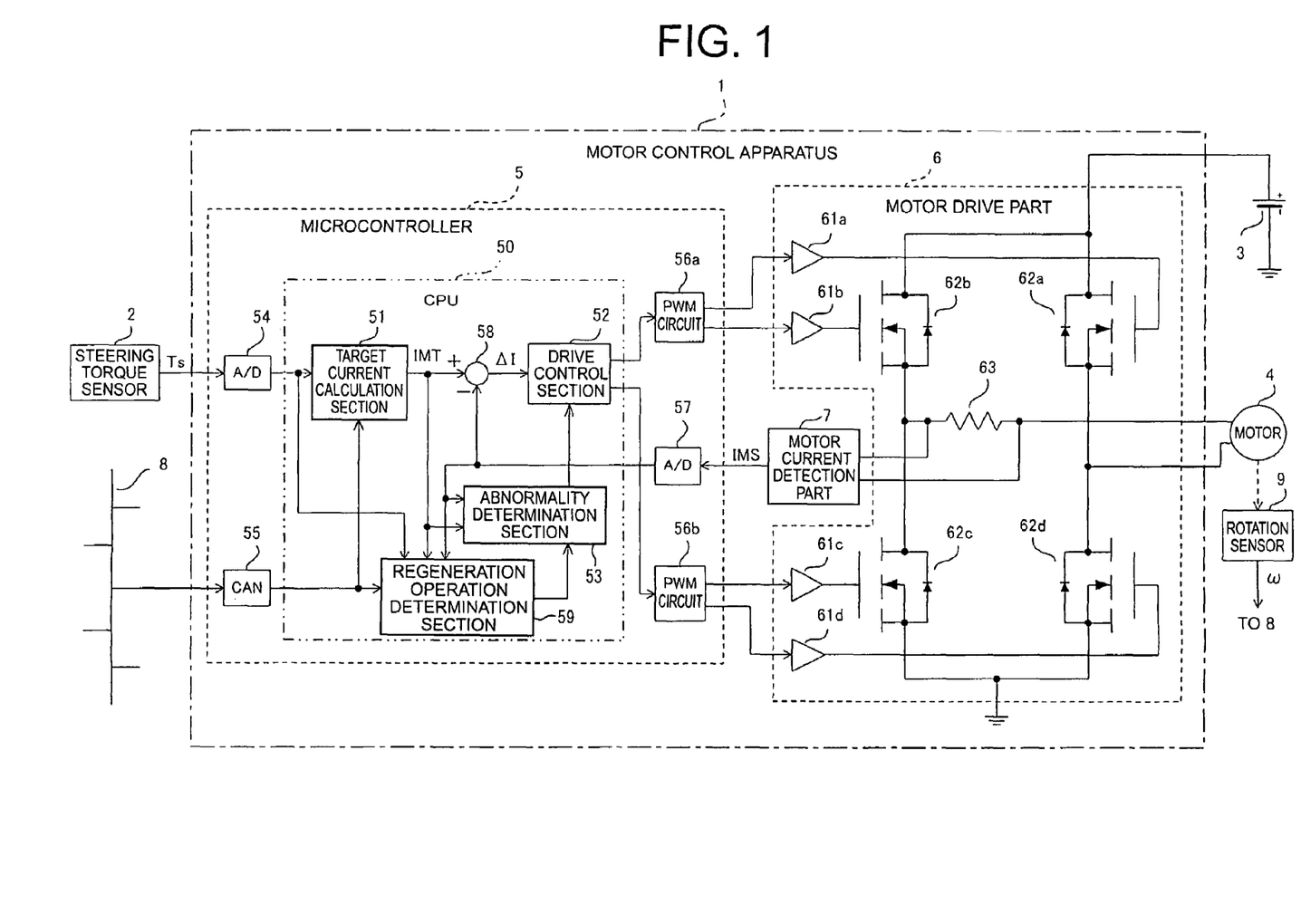
FIG. 1 is a circuit block diagram showing a motor control apparatus according to a first embodiment of the present invention.

FIG. 1 is a circuit block diagram that shows a motor control apparatus for a vehicle according to a first embodiment of the present invention, wherein the configuration of the apparatus when applied to a vehicular electric power steering system is illustrated.

In FIG. 1, a steering torque sensor 2, a battery 3, a dc motor (hereinafter referred to simply as a "motor") 4, and an invehicle network 8 are connected to the motor control apparatus which is generally designated at reference numeral 1.

The motor 4 is provided, as required, with a rotation sensor 9, and a detection signal of the rotation sensor 9

(corresponding to the rotational speed ω of the motor 4) is input to the motor control apparatus 1 through the invehicle network 8.

The steering torque sensor 2 detects a steering force provided by the driver of a vehicle (not shown), and inputs a detection signal in the form of a steering torque Ts to the motor control apparatus 1.

The battery 3 functions as a vehicle-mounted power supply, and supplies electric power to the motor control apparatus 1.

The motor 4 is connected with a steering system (not shown) that is operated by the driver, so that it is driven to generate an assist torque in accordance with a motor current command value from the motor control apparatus 1 thereby to control the behavior of the vehicle.

The invehicle network 8 serves to acquire operating state information of the vehicle (a pulse signal of vehicle speed information, etc.) from various kinds of sensors (not shown) and input it to the motor control apparatus 1.

The motor control apparatus 1 is provided with a microcontroller 5, a motor drive part 6, and a motor current detection part 7. The microcontroller 5 may include the function of the motor current detection part 7.

The microcontroller 5 is provided with a CPU 50, AD converters 54, 57, a CAN 55, and pulse modulation circuits 56a, 56b (hereinafter referred to as "PWM circuits").

The CPU 50 includes a target current calculation section 51 (a command value calculation section), a drive control section 52, an abnormality determination section 53, a subtraction section 58 and a regeneration operation determination section 59, and executes software to achieve these sections 51 through 53, 58, and 59.

In the microcontroller 5, the AD converter 54 AD converts various analog sensor signals such as the steering torque Ts, etc., and inputs them to the CPU 50. The CAN 55 inputs various digital sensor signals taken in through the invehicle network 8 to the CPU 50. The PWM circuits 56a, 56b generate drive signals (PWM signals each comprising a drive duty ratio) to the motor drive part 6 based on the output signals of the CPU 50. The AD converter 57 AD converts a detected current IMS (a motor current detected value) from the motor current detection part 7, and inputs it to the CPU 50.

In the CPU 50, the target current calculation section 51 calculates a target current IMT (motor current command value) for driving and controlling the motor 4 based on the steering torque Ts through the AD converter 54 and the various digital sensor signals through the CAN 55. The subtraction section 58 calculates a current deviation ΔI (=IMT−IMS) between the target current IMT from the target current calculation section 51 and the detected current IMS through the AD converter 57. When the current deviation ΔI between the target current IMT and the detected current IMS indicates a value larger than or equal to a predetermined determination threshold (to be described later), the abnormality determination section 53 determines (detects) that the motor 4 or the motor drive part 6 is in a abnormal state, and generates an abnormality determination signal.

The driving control part 52 generates drive signals to the motor drive part 6 based on the current deviation ΔI thereby to drive and control the motor 4. Also, the driving control part 52 stops outputting the drive signals to the motor drive part 6 in response to the abnormality determination signal from the abnormality determination section 53.

The regeneration operation determination section 59 determines the regeneration operation state of the motor 4 based on various kinds of sensor signals (parameters representing the operating state of the motor 4 or the vehicle), and when determined that the motor 4 is in a regeneration operation state, changes the determination condition or criterion (the determination threshold) of the abnormality determination section 53 from the determination condition or criterion for the power running of the motor 4 in such a manner that the determination threshold is set to be greater than a value at the time of power running of the motor 4. In this case, when the polarity of the detected current IMS (the motor current detected value) is different from the polarity of the target current IMT (the motor current command value), the regeneration operation determination section 59 determines that the motor 4 is in the regeneration operation.

The motor drive part 6 is composed of gate drive circuits 61a through 61d, power MOSFETs 62a through 62d, and a resistor 63. The power MOSFETs 62a through 62d together constitute an H bridge circuit, and a diode is connected in antiparallel to each power MOSFET so that the power MOSFETs 62a through 62d are driven by the individual gate drive circuits 61a through 61d, respectively. The resistor 63 has a very small resistance value, and is inserted in a current supply path to the motor 4 with its opposite ends being connected to the motor current detection part 7. The motor current detection part 7 detects the drive current of the motor 4 (the motor current supplied from the motor drive part 6 to the motor 4) based on a voltage across the opposite ends of the resistor 63, and inputs it to the microcontroller 5 as the detected current IMS.

With the above construction, the microcontroller 5 controls the motor current supplied to the motor 4 in a feedback manner so as to make the detected current IMS (the motor current detected value) coincide with the target current IMT (the motor current command value).

Here, note that the CPU 50 in the microcontroller 5 includes various detection sections that cooperate with the various kinds of sensors including a vehicle speed sensor (not shown), the steering torque sensor 2 and the rotation sensor 9, and the detected values of the various detection sections are related to the determination condition or criterion of the regeneration operation determination section 59, as will be described later.

For example, the torque detection section in the CPU 50 cooperates with the steering torque sensor 2 for detecting the steering torque Ts applied to the steering system. In addition, the target current calculation section 51 calculates only the target current IMT for the power running of the motor 4, and when the detected current IMS in the direction of power running during the power running operation indicates a value larger than the target current IMT by a first determination threshold TH1 or more, or when the detected current IMS in the direction of regeneration during the regeneration operation indicates a value larger than the target current IMT by a second determination threshold TH2 (>TH1) or more, the abnormality determination section 53 generates an abnormality determination signal.

Also, the CPU 50 in the microcontroller 5 further includes a rotation detection section that cooperates with the rotation sensor 9 to detect the rotational speed ω [rad/sec] of the motor 4, and a voltage detection section that detects the power supply voltage of the power supply (battery 3) which supplies electric power to the motor 4, wherein the CPU 50 variably sets the first and second determination thresholds TH1, TH2 in accordance with the rotational speed ω and the power supply voltage (battery voltage) of the motor 4.

Further, the CPU 50 in the microcontroller 5 includes an abnormality determination stopping section (not shown) that serves to inhibit the abnormality determination processing of the abnormality determination section 53 when the rotational speed ω of the motor 4 indicates a predetermined value or above.

Now, reference will be made to a specific operation of the motor control apparatus as illustrated in FIG. 1 according to the first embodiment of the present invention while referring to a flow chart in FIG. 2 and explanatory views in FIGS. 3 through 6.

Figure 2:
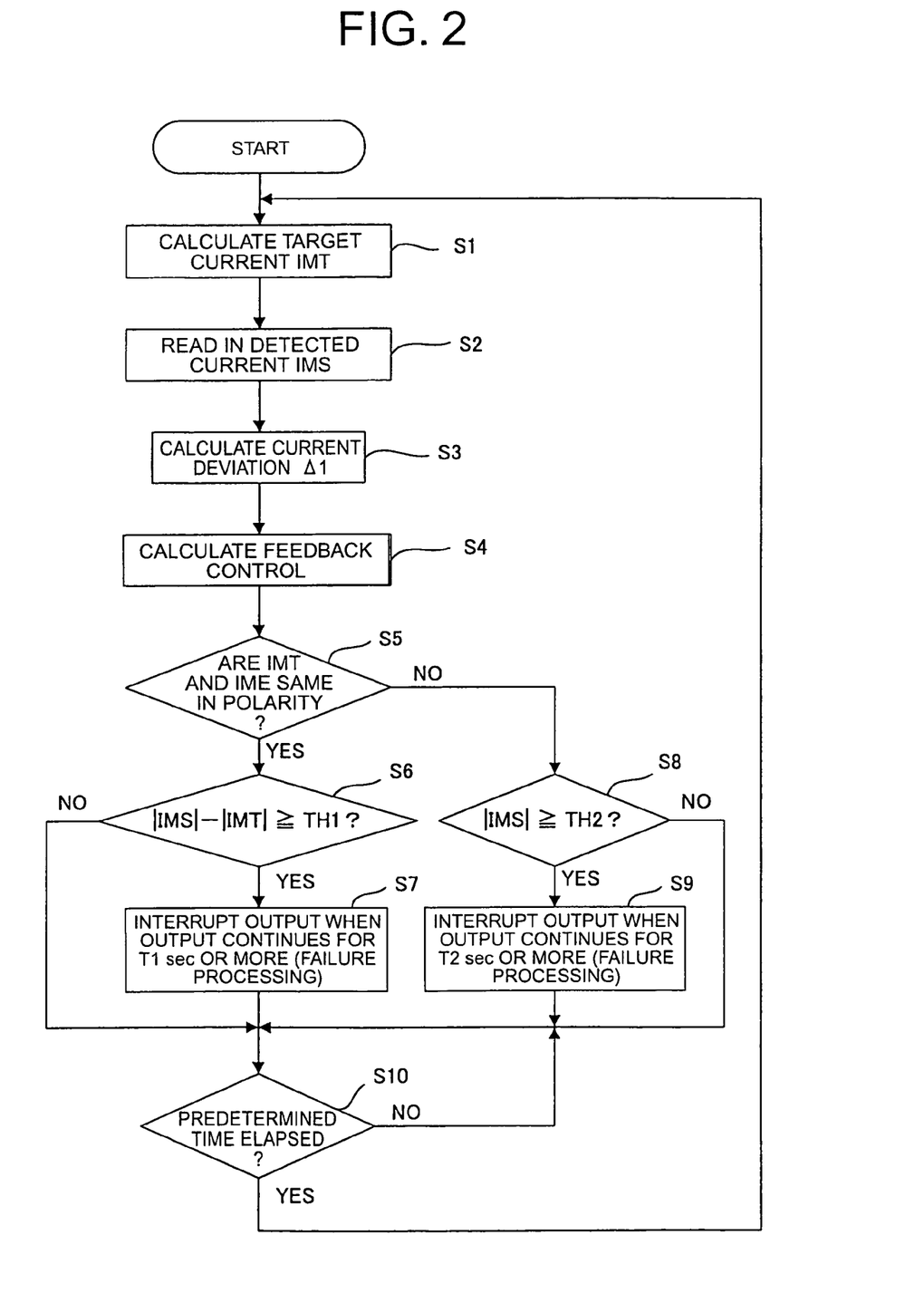
FIG. 2 is a flow chart illustrating the operation of the motor control apparatus according to the first embodiment of the present invention.

FIG. 2 shows a processing routine of the microcontroller 5, wherein steps S1 through S4 represent the processing for controlling the output torque of the motor 4, and steps S5 through S9 represent the abnormality determination processing for the motor 4.

In addition, step S10 in FIG. 2 is wait management processing that is inserted into a return path to step S1 after the execution of the abnormality determination processing. According to step 10, a return to step S1 is performed after a predetermined time is awaited from the execution of steps S1 through S9, so that the processing routine of FIG. 2 is executed repeatedly at a predetermined period or interval.

Figure 3:
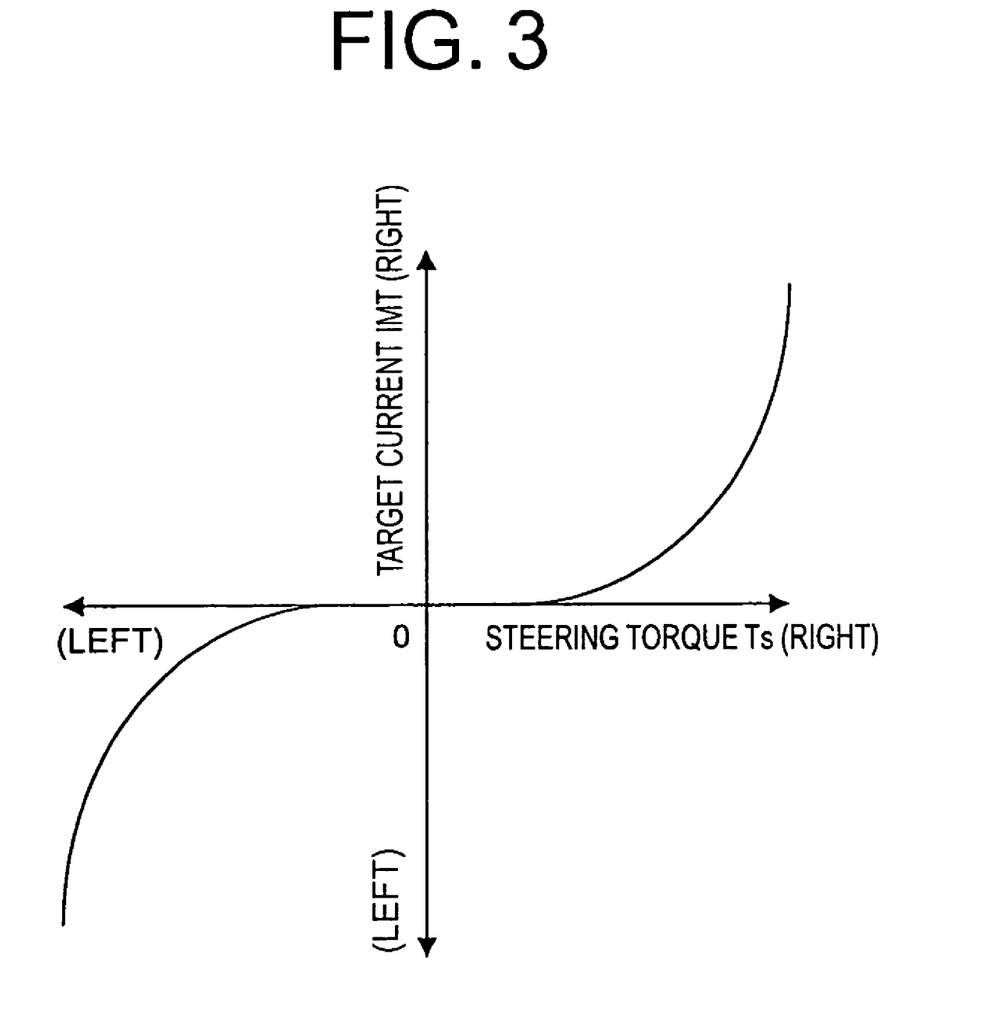
FIG. 3 is a plan view showing the calculation characteristic of a target current according to the first embodiment of the present invention.

FIG. 3 illustrates map data for calculation stored in the target current calculation section 51, wherein the characteristic of the target current IMT (the axis of ordinate) in the right and left direction uniquely decided with respect to the steering torque Ts in the right and left direction (the axis of abscissa) is shown.

Figure 4:
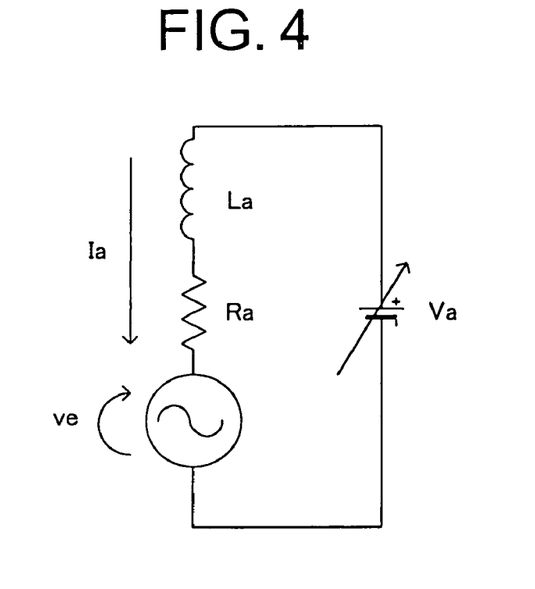
FIG. 4 is an explanatory view showing, in an equivalent circuit, a simple model of a motor controlled according to the first embodiment of the present invention.

FIG. 4 shows a simple model of the motor 4 in an equivalent circuit. In FIG. 4, the equivalent circuit of the motor 4 is represented by an impressed voltage Va [V] to the motor 4, an armature inductance La [H] of the motor 4, an armature resistance Ra [Ω] thereof, an armature current Ia [A] thereof, and a counterelectromotive force ve [V] thereof.

Figure 5:
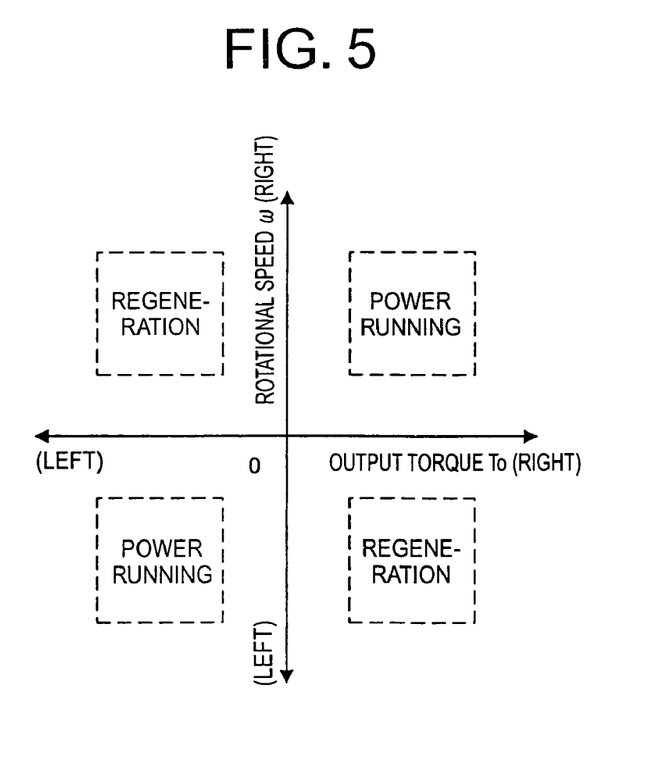
FIG. 5 is an explanatory view showing a relation between power running and regeneration running of the motor controlled according to the first embodiment of the present invention.

FIG. 5 shows the region of power running and the regeneration operation of the motor 4 in association with the output torque To in the right and left direction (the axis of abscissa) and the rotational speed ω in the right and left direction (the axis of ordinate). In FIG. 5, a first quadrant and a third quadrant correspond to the regeneration operation, and a second quadrant and a fourth quadrant correspond to the power running.

In FIG. 2, first of all, t he torque detection section in the CPU 50 reads in a detection signal (steering torque Ts) from the steering torque sensor 2 through the AD converter 54, and the target current calculation section 51 sets the target current IMT, for example, by performing map calculation (i.e., calculation using a map) in accordance with the characteristic of FIG. 3 (step S1). In addition, the CPU 50 reads in the detected current IMS from the motor current detection part 7 through the AD converter 54 (step S2).

Subsequently, the subtraction section 58 calculates the current deviation ΔI between the target current IMT and the detected current IMS (step S3), and the drive control section 52 executes calculation processing using a feedback control algorithm such as Pi control, etc., on the basis of the current deviation ΔI, and decides an impression voltage Va to the motor 4 (step S4). Hereinafter, the motor 4 is driven to operate through the PWM circuits 56a, 56b and the motor drive part 6 on the basis of the impression voltage Va thus calculated by the CPU 50.

Then, the CPU 50 cooperates with the regeneration operation determination section 59 and the abnormality determination section 53 to execute abnormality determination processing for the motor control apparatus 1 or the motor 4 (steps S5 through S9) on the basis of the target current IMT and the detected current IMS.

Here, detailed reference will be made to the behavior of each piece of detected information at the time of power running and regeneration operation related to processing in steps S5 through S9 by using FIG. 4 and FIG. 5.

In the simple model of FIG. 4, the counterelectromotive force ve is generated in proportion to the rotational speed ω of the motor 4 and in a direction to decrease the rotational speed ω. Also, the output torque To of the motor 4 is generated in proportion to and in the same direction as the armature current Ia.

Here, the impression voltage Va [V] to the motor 4 is represented by using the armature inductance La [H], the armature resistance Ra [Ω], the armature current Ia [A], the counterelectromotive force ve [V] and the rotational speed ω [rad/sec], as shown by the following expression (1).

$$\begin{aligned}[\text{\textbf{数}}]: Va &= Ia \cdot Ra + La \cdot dIa/dt - ve \\ &= Ia \cdot Ra + La \cdot dIa/dt - Ke \cdot \omega\end{aligned} \quad (1)$$

where Ke is a motor counterelectromotive force constant [Vs/rad].

Since the power running and the regeneration operation of the motor 4 are defined as shown in FIG. 5, it is found from expression (1) above and FIG. 5 that the counterelectromotive force ve of the motor 4 during the power running thereof is generated in a direction to decrease the armature current Ia, i.e., in a direction opposite to that of the impression voltage Va.

On the other hand, it is found that the counterelectromotive force ve of the motor 4 during the regeneration operation thereof is generated in a direction to increase the armature current Ia, i.e., in the same direction as that of the impression voltage Va.

From the above, it is found that even if the armature current Ia is controlled in a feedback manner, as in the first embodiment of the present invention, the armature current Ia during the regeneration operation has an overshoot tendency due to the influence of the counterelectromotive force ve, as compared with that during the power running.

In addition, it is further found that the above-mentioned feedback control operates to stabilize the armature current Ia during the regeneration operation, whereby when the motor rotational speed ω indicates a predetermined value (i.e., the counterelectromotive force ve exceeds the power supply voltage) or above even if the impression voltage Va is impressed to the motor 4 in a direction opposite to the counterelectromotive force or voltage ve, the impression voltage Va reaches the power supply voltage and hence is saturated, so the counterelectromotive force ve exceeds the impression voltage Va thereby to cause the armature current Ia to flow back toward the power supply side.

Moreover, the target current calculation section 51 generates only the target current IMT in the form of a torque command, as shown in FIG. 3, but does not generate a target current for the regeneration operation.

However, the rotational direction of the motor 4 might be made in a direction opposite to that of the output torque To of the motor 4 due to external torque disturbances from the load of the motor 4 (e.g., the front wheels of the vehicle are returned to a steering neutral position due to a reactive force from the road surface, etc.). In this case, the output signal of the drive control section 52 (the impression voltage Va to the motor 4) is limited and saturated by the voltage of the battery 3, as previously stated, the target current IMT and the detected current IMS become opposite in polarity to each other.

Accordingly, in consideration of the above-mentioned operation at the time of regeneration operation, when it is determined in steps S5 through S8 that the motor 4 is in the state of regeneration operation, the regeneration operation determination section 59 and the abnormality determination section 53 in the CPU 50 set the value of the determination threshold to a value (second determination threshold TH2) which is larger than that at the time of power running of the motor 4 (first determination threshold TH1).

Here, the abnormality determination condition for the regeneration operation and that for the power running operation are switched from each other, and at the same time the abnormality determination threshold is also switched between the first determination threshold TH1 and the second determination threshold TH2. Specifically, when it is determined that the motor 4 is in the regeneration operation, the microcontroller 5 changes the determination condition of the abnormality determination section 53 from a first determination condition, which is a determination condition at the time of the power running of the motor 4, to a second determination condition, which is a determination condition at the time of the regeneration operation of the motor 4. In addition, as will be described later, at the time of the power running operation of the motor 4, the abnormality determination section 53 generates an abnormality determination signal when the current deviation indicates the first determination threshold TH1 or above, whereas at the time of the regeneration operation of the motor 4, the abnormality determination section 53 generates an abnormality determination signal when the motor current detected value indicates the second determination threshold TH2 (>TH1) or above.

First of all, the regeneration operation determination section 59 compares the polarities of the target current IMT and the detected current IMS with each other, and determines whether the polarities of both the currents are the same (step S5). When determined that the polarities are the same (that is, YES), it is assumed that the motor 4 is in the power running operation, and the control flow advances to abnormality determination processing (step S6).

In step S6, the abnormality determination section 53 compares the detected current IMS and the target current IMT with each other, and determines whether the absolute value of the current deviation ΔI (=|IMS−IMT|) is larger than or equal to the first determination threshold TH1.

In this case, the detected current IMS and the target current IMT are the same in polarity, so the presence or absence of abnormality can be determined by whether the following expression (2) is satisfied.

$$|IMS|-|IMT| \geq TH1 \qquad (2)$$

When it is determined as |IMS|−|IMT|<TH1 in step S6 (that is, NO), the motor 4 is in the normal state and hence the control flow proceeds to step S10, where the processing routine of FIG. 2 is exited after a predetermined time has elapsed, and a return to step S1 is carried out.

On the other hand, when it is determined as |IMS|−|IMT|≥TH1 in step S106 (that is, YES), the detected current IMS overshoots the target current IMT by the first determination threshold TH1 or more in spite of the power running operation, so it is assumed that the motor 4 is in the state of abnormality occurrence (the state of wiring abnormality such as a ground fault, etc.), and generates a temporal abnormality determination signal.

Subsequently, at the point in time when a predetermined time T1 [second] has elapsed with the abnormality occurrence state of the motor 4 being held (continued), it is assumed that motor 4 is in the state of final abnormality determination, and failure processing is carried out (step S7).

At this time, when the temporal abnormality determination signal continues for the predetermined time T1 [second] or more, the output of the drive signals from the drive control section 52 is interrupted. Here, note that no final abnormality determination signal is generated until the predetermined time T1 has elapsed, and hence the control flow proceeds to step S10, and a return to step S1 is then carried out so that the above-mentioned processing is executed repeatedly at a predetermined period or interval.

Thus, it can be assumed that the final abnormality determination signal generated after the predetermined time T1 has elapsed in step S7 (after the abnormality determination signal has continued for the predetermined time T1) is not the one which has temporarily satisfied expression (2) above under the influence of noise or the like, but indicates an abnormality occurrence state in a reliable manner.

In step S7, the abnormality determination section 53 generates the final abnormality determination signal thereby to interrupt a drive output from the drive control section 52 to the motor drive part 6 for example, as stated above, whereby the power MOSFETs 62a through 62d, etc., in the motor drive part 6 can be protected from an excessively large ground fault current. Hereinafter, the control flow proceeds to step S10, and then a return to step S1 is performed after the predetermined time has elapsed.

On the other hand, when it is determined in step S5 that the target current IMT and the detected current IMS are different in polarity from each other (that is, NO), the regeneration operation determination section 59 assumes that the motor 4 is in the regeneration operation, and determines the presence or absence of a failure by switching the determination condition of the abnormality determination section 53 from the abnormality determination condition for the power running operation (step S6) to the abnormality determination condition for the regeneration operation (step S8).

In this case, since the motor 4 is in the regeneration operation state, the armature current Ia tends to overshoot, as previously stated, or there is a possibility that the output signal of the drive control section 52 (the impression voltage Va to the motor 4) is saturated to break the feedback of the armature current Ia, so the current deviation (=|IMS|−|IMT|) between the target current IMT and the detected current IMS can exceed the first determination threshold TH1 even if there occurs no abnormality such as a ground fault, etc.

Accordingly, the abnormality determination section 53 does not execute the abnormality determination processing (step S6) using the above expression (2), but instead executes, in step S8, abnormality determination processing as to whether the absolute value (=|IMS|) of the detected current during the regeneration operation is larger than the second determination threshold TH2 (>TH1).

At this time, the abnormality determination section 53 determines the presence or absence of abnormality depending upon whether the following expression (3) is satisfied.

$$|MS|>TH2 \qquad (3)$$

When it is determined in step S8 that expression (3) above is satisfied (that is, YES), it is assumed that the motor 4 is abnormal even in consideration of the regeneration operation thereof, so a temporal abnormality determination signal is generated, and the control flow advances to final failure processing (step S9) during the regeneration operation.

Specifically, in step S9, at a point in time when the temporal abnormality determination signal continues for a predetermined time T2 [second] or more, the abnormality determination section 53 outputs a final abnormality determination signal thereby to interrupt the drive output from the drive control section 52 to the motor drive part 6. At this time, the final abnormality determination signal is not generated until the predetermined time T2 has elapsed, and the control flow proceeds to step S10.

Hereinafter, the control flow proceeds to step S10, and then a return to step S1 is performed after the predetermined time has elapsed.

Thus, in step S9, by outputting the final abnormality determination signal at the time point when the temporal abnormality determination state has continued for the predetermined time T2, it is possible to prevent temporal incorrect determination resulting from noise, etc., so that the output of the motor drive part 6 is interrupted only when it is determined in a reliable manner that the motor 4 is abnormal, thereby making it possible to protect the MOSFET 62, etc., from the ground fault current.

In addition, as stated above, the wait processing in step S10 is inserted into a return path to step S1, so management can be done in such a manner that the above-mentioned processing (steps S1 through S9) is executed at the predetermined period or interval.

Figure 6:
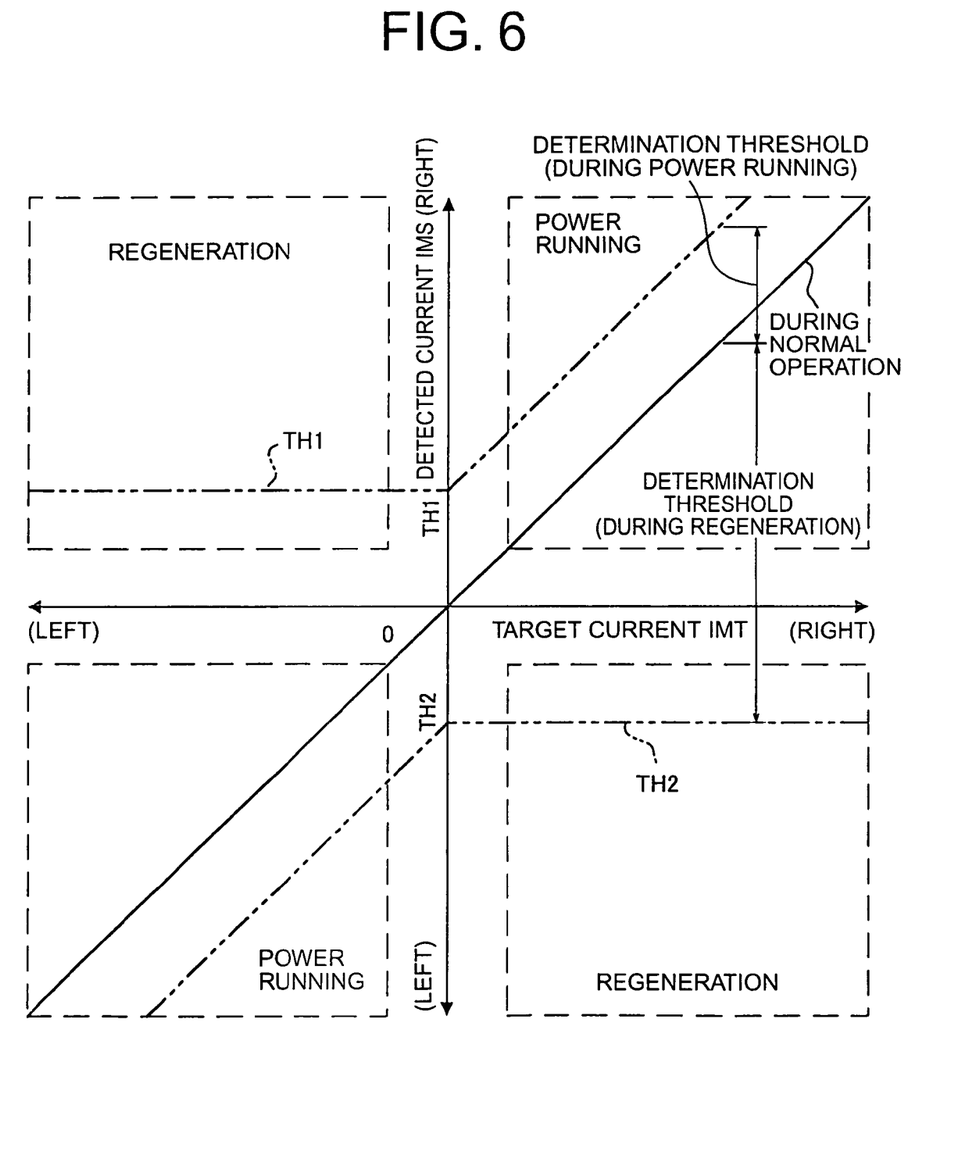
FIG. 6 is an explanatory view showing a relationship between the relation between power running and regeneration running of the motor controlled according to the first embodiment of the present invention, and respective determination thresholds.

FIG. 6 is an explanatory view that shows individual set values and detected values in the above-mentioned processing (steps S5 through S9), wherein the mutual relation of the target current IMT, the detected current IMS and the first and second determination thresholds TH1, TH2 is shown.

As will be clear from FIG. 6, it is found that by setting the first and second determination thresholds TH1, TH2 to a relation of "TH1<TH2", a determination is made that the motor 4 is abnormal (in a fault state), when a difference between the target current IMT and the detected current IMS during the regeneration operation is large as compared with that during the power running operation.

As described above, according to the first embodiment of the present invention, when the target current IMT and the detected current IMS are different in polarity from each other, it is determined that the motor 4 is in the regeneration operation state, and upon determination of the regeneration operation state of the motor 4, the determination condition of the abnormality determination section 53 is changed. In this case, the determination threshold is set to the second determination threshold TH2 which is larger than the first determination threshold TH1, so an appropriate abnormality determination can be made in accordance with the power running operation and the regeneration operation of the motor 4.

In addition, the target current calculation section 51 calculates only the target current IMT for the power running of the motor 4, and the abnormality determination section 53 generates an abnormality determination signal to interrupt the output of the drive control section 52 when the detected current IMS (motor current detected value) in the direction of power running indicates a value larger than the target current IMT by the first determination threshold TH1 or more, or when the detected current IMS in the direction of regeneration indicates a value larger than the target current IMT by the second determination threshold TH2 (>TH1) or more. As a result, it is possible to achieve a highly reliable abnormality determination.

Here, note that the detected current IMS flowing in the opposite direction to the target current IMT during the regeneration operation changes in accordance with the voltage of the battery 3 and the rotational speed ω of the motor 4, so the abnormality determination threshold TH2 may be varied in accordance with the voltage of the battery 3 and the rotational speed ω of the motor 4.

For example, when the power supply voltage is high, a highly reliable abnormality determination can be achieved by changing each of the determination thresholds TH1, TH2 to an increased side.

In addition, when the rotational speed ω of the motor 4 rises to a predetermined value or above during the regeneration operation thereby to cause a large regeneration current to flow, the second determination threshold TH2 for abnormality determination is changed to an increased side in accordance with the rising of the rotational speed ω, whereby a highly reliable abnormality determination can be achieved while preventing incorrect determination even at the time of the increasing rotation of the motor 4 during the regeneration operation thereof.

On the other hand, when the abnormality determination threshold TH2 is not changed in accordance with the rotational speed ω of the motor 4, the abnormality determination processing may be inhibited as follows.

That is, when the rotational speed ω of the motor 4 indicates the predetermined value or higher during the regeneration operation of the motor 4 to saturate the feedback control output of the drive control section 52 (the impression voltage Va to the motor 4), current feedback control does not operate, thus making it difficult to make an exact abnormality determination. Accordingly, the execution of abnormality determination processing (steps S5 through S9) by the abnormality determination section 53 may be inhibited. As a result, a highly reliable abnormality determination can be achieved by preventing an incorrect determination during the rising of the rotation of the motor 4.

Embodiment 2

In the above-mentioned first embodiment, the power running and the regeneration operation of the motor 4 are determined by a polarity comparison between the target current IMT and the detected current IMS (see step S5 in FIG. 2), but in case where the CPU 50 is provided with a rotation detection section for detecting the rotational speed ω of the motor 4, the power running and the regeneration operation of the motor 4 may be determined based on the polarities of the detected current IMS and the rotational speed ω of the motor 4 by using a definition as illustrated in FIG. 5.

In this case, the CPU 50 in the microcontroller 5 has a motor rotational direction detection section that cooperates with the rotation sensor 9 to detect the rotational direction of the motor 4, and the regeneration operation determination section 59 determines that the motor 4 is in the regeneration operation, when the rotational direction of the motor 4 is different from the direction of the detected current IMS (the motor current detected value).

The motor rotational direction detection section in the CPU 50 may detect the rotational direction of the motor 4 based on the counterelectromotive force ve generated by the motor 4 (see FIG. 4).

Thus, by determining the regeneration operation with the use of the definition (FIG. 5) based on the detected current IMS and the rotational speed ω of the motor 4, it is possible to determine the change of the operating state of the motor 4 at an early time before the detected current IMS overshoots, so for example, an abnormality determination time in step S7 in FIG. 2 can be set shorter.

In addition, the regeneration operation may be determined by using the target current IMT in place of the detected current IMS, and by making a comparison between the polarity of the target current IMT and the polarity of the rotational speed ω.

This is because a following time until the detected current IMS is stabilized to follow the target current IMT after the direction of the target current IMT has been changed is short to a satisfactory extent as compared with a time until the rotational direction of the motor 4 is actually changed, and hence can be ignored.

In other words, even in a state where the direction of the target current IMT has been changed to the regeneration operation and the feedback control of the drive control section 52 tends to overshoot, a relatively long time is required until the rotational direction of the motor 4 has been actually changed, due to the influence of the moment of inertia of the armature of the motor 4, so in comparison with this, the stabilization period for the feedback control of the detected current IMS is sufficiently short and can be ignored.

Thus, in case where the regeneration operation is determined by making a comparison between the polarity of the target current IMT and the polarity of the rotational speed ω with each other, it is possible to reduce the influence of the noise contained in the detected current IMS.

Embodiment 3

In case where the motor control apparatus is applied to the steering system as in the above-mentioned first embodiment, the relation between the target current IMT and the steering torque Ts is generally represented by a monotonically increasing function, as shown in FIG. 3, so when the steering torque Ts detected by the steering torque sensor 2 and the detected current IMS of the current detection section 7 indicate opposite polarities with respect to each other, the regeneration operation determination section 59 may determine that the motor 4 is in the regeneration operation.

As a result, operational effects similar to the above-mentioned are achieved.

In this case, the motor 4 is connected with the steering system of the vehicle, and the CPU 50 is provided with a torque detection section that detects the steering torque Ts impressed to the steering system, and a motor rotational direction detection section that detects the rotational direction of the motor 4.

In addition, the target current calculation section 51 calculates the target current IMT in accordance with the steering torque Ts, and the regeneration operation determination section 59 determines that the motor 4 is in the regeneration operation, when the direction of the steering torque Ts is different from the rotational direction of the motor 4.

Further, in case where provision is made for a rotation detection section that detects the rotational speed ω of the motor 4, as in the above-mentioned second embodiment, the power running and the regeneration operation may be determined based on the polarity of the steering torque Ts from the steering torque sensor 2 and the polarity of the rotational speed ω of the motor 4.

Embodiment 4

In addition, when the target current calculation section 51 generates only the target current IMT (torque command) during the power running operation, as in the above-mentioned first embodiment, the regeneration operation is reached when the impression voltage Va in the form of an amount of operation for feedback control is increased to the power supply voltage (i.e., is saturated), so when it is assumed that the impression voltage Va becomes substantially the same value as the power supply voltage and saturated, a determine may be made that the motor 4 is in the regeneration operation.

In this case, the target current calculation section 51 calculates only the target current IMT for the power running of the motor 4, and when the amount of operation for the feedback control of the detected current IMS (motor current) has been saturated, the regeneration operation determination section 59 determines that the motor 4 is in the regeneration operation.

In addition, the CPU 50 in the microcontroller 5 is further provided with a power supply current detection section (not shown) for detecting a current flowing into the power supply (the battery 3) that supplies electric power to the motor drive part 6, and when the state of a current flowing from the motor drive part 6 into the power supply is detected, the regeneration operation determination section 59 may determines that the motor 4 is in the regeneration operation. As a result, appropriate protection can be provided while preventing an incorrect determination during the regeneration operation of the motor 4, as stated above.

Although a variety of kinds of well-known sections are considered as the power supply current detection section, there may be employed, for example, an additional resistor (not shown) that is inserted between the battery 3 and the motor drive part 6 if there is a margin in the volume of the motor control apparatus 1. In this case, when the state of the backflow of current from the motor 4 to the battery 3 is detected through the action of the additional resistor, a determination can be made that the motor 4 is in the regeneration operation.

Moreover, in case where the impression voltage Va is limited to a predetermined limit value or below so as to protect the motor drive part 6 or the like before the impression voltage Va reaches the power supply voltage, the regeneration operation of the motor 4 may be determined by comparing the impression voltage Va with a predetermined limit value.

Further, in the above-mentioned first through fourth embodiments, processing for determining whether a predetermined time has elapsed (step S7 in FIG. 2) is provided so as to prevent an incorrect determination based on a temporal abnormality determination signal, but when the influence of noise, etc., can be ignored, the determination of abnormality may be made at once without waiting for the elapse of the predetermined time.

While the invention has been described in terms of preferred embodiments, those skilled in the art will recognize that the invention can be practiced with modifications within the spirit and scope of the appended claims.

What is claimed is:

1. A motor control apparatus comprising:
   a motor drive part that supplies a motor current to the motor;
   a motor current detection part that detects said motor current; and
   a controller to which a motor current detected value from said motor current detection section is input, and which outputs a drive signal to said motor driving part;
   said controller comprising:

a command value calculation section that calculates a motor current command value corresponding to a target value of said motor current; and an abnormality determination section that generates an abnormality determination signal when a difference between said motor current detection value and said motor current command value indicates a value larger than or equal to a predetermined determination threshold;

wherein said motor current is controlled in a feedback manner such that said motor current detection value is made to coincide with said motor current command value;

said controller further comprises a regeneration operation determination section that determines whether said motor is in a regeneration operation state; and when it is determined that said motor is in a regeneration operation, said controller sets said determination threshold to a value larger than that during a power running operation of said motor.

2. The motor control apparatus as set forth in claim 1, wherein
when the polarity of said motor current detected value is different from the polarity of said motor current command value, said regeneration operation determination section determines that said motor is in a regeneration operation.

3. The motor control apparatus as set forth in claim 1, wherein
said controller further comprises a motor rotational direction detection section that detects the rotational direction of said motor; and
when the rotational direction of said motor is different from the direction of said motor current detected value, said regeneration operation determination section determines that said motor is in a regeneration operation.

4. The motor control apparatus as set forth in claim 1, wherein
said controller further comprises a motor rotational direction detection section that detects the rotational direction of said motor; and
when the rotational direction of said motor is different from the direction of said motor current command value, said regeneration operation determination section determines that said motor is in a regeneration operation.

5. The motor control apparatus as set forth in claim 1, wherein
said motor is connected with a steering system of a vehicle;
said controller further comprises a torque detection section that detects a steering torque applied to said steering system;
when the direction of said motor current detected value is different from the direction of said steering torque, said regeneration operation determination section determines that said motor is in a regeneration operation.

6. The motor control apparatus as set forth in claim 1, wherein
said motor is connected with a steering system of a vehicle;
said controller further comprises: a torque detection section that detects a steering torque applied to said steering system; and a motor rotational direction detection section that detects the rotational direction of said motor;
when the direction of said steering torque is different from the rotational direction of said motor, said regeneration operation determination section determines that said motor is in a regeneration operation.

7. The motor control apparatus as set forth in claim 1, wherein
said command value calculation section calculates only the motor current command value for the power running operation of said motor; and
when an amount of operation for feedback control of said motor current is saturated, said regeneration operation determination section determines that said motor is in a regeneration operation.

8. The motor control apparatus as set forth in claim 1, wherein
said controller further comprises a power supply current detection section that detects the state of current flowing into a power supply that supplies electric power to said motor drive part;
when the state of current flowing from said motor drive section into said power supply is detected, said regeneration operation determination section determines that said motor is in a regeneration operation.

9. The motor control apparatus as set forth in claim 1, wherein
said command value calculation section calculates only a motor current command value for the power running operation of said motor; and
said abnormality determination section sets a first determination threshold during the power running operation of said motor, sets a second determination threshold larger than said first determination threshold during the regeneration operation of said motor, and generates an abnormality determination signal when the motor current detected value in the direction of power running indicates a value larger than said motor current command value by said first determination threshold or more, or when the motor current detected value in the direction of regeneration indicates a value larger than said motor current command value by said second determination threshold or more.

10. The motor control apparatus as set forth in claim 1, wherein said controller further comprises:
a rotation detection section that detects the rotational speed of said motor; and
a voltage detection section that detects the power supply voltage of a power supply that supplies electric power to said motor;
wherein said determination threshold is variably set in accordance with said rotation speed and said power supply voltage.

11. The motor control apparatus as set forth in claim 10, wherein
said controller further comprises an abnormality determination stopping section that serves to inhibit the abnormality determination processing of said abnormality determination section when the rotational speed of said motor indicates a predetermined value or above.

12. The motor control apparatus as set forth in claim 1, wherein
said drive control section stops the output of said drive signal in response to said abnormality determination signal.

13. The motor control apparatus as set forth in claim 1, wherein
when said abnormality determination signal has been continuously generated over a predetermined time, said abnormality determination section generates a final abnormality determination signal.

14. The motor control apparatus as set forth in claim 1, wherein said controller further comprises:
a subtraction section that calculates a current deviation between said motor current command value and said motor current detected value; and
a drive control section that generates said drive signal based on said current deviation;
wherein when it is determined that said motor is in a regeneration operation, said controller changes a determination condition of said abnormality determination section from a first determination condition during the power running of said motor to a second determination condition; and said abnormality determination section sets a first determination threshold during the power running operation of said motor, sets a second determination threshold that is larger than said first determination threshold during the regeneration operation of said motor, generates said abnormality determination signal when said current deviation indicates a value more than or equal to said first determination threshold during the power running operation of said motor, and generates said abnormality determination signal when said motor current detected value indicates a value more than or equal to said second determination threshold during the regeneration operation of said motor.

* * * * *